United States Patent [19]
Doerfler

[11] 3,980,345
[45] Sept. 14, 1976

[54] METERING AND PROPORTIONING VALVE MECHANISM

[75] Inventor: Roger E. Doerfler, Detroit, Mich.

[73] Assignee: Kelsey-Hayes Company, Romulus, Mich.

[22] Filed: June 19, 1975

[21] Appl. No.: 588,329

[52] U.S. Cl. .......................... 303/6 C; 188/151 A;
    188/349; 200/82 D; 303/84 A
[51] Int. Cl.² ...................... B60T 8/26; B60T 17/22
[58] Field of Search ..................... 303/6 C, 6 R, 84;
    188/349, 151 A; 200/82 D; 340/52 C;
    137/627.5

[56] References Cited
UNITED STATES PATENTS

| | | | |
|---|---|---|---|
| 3,480,333 | 11/1969 | Stelzer | 188/151 A X |
| 3,489,465 | 1/1970 | Bueler | 303/6 C X |
| 3,586,384 | 6/1971 | Falk | 188/349 X |
| 3,612,618 | 10/1971 | Swanson | 303/6 C |
| 3,614,169 | 10/1971 | Bueler | 303/6 C |
| 3,768,869 | 10/1973 | Bueler et al | 303/6 C |
| 3,776,602 | 12/1973 | Bueler | 188/349 X |
| 3,787,096 | 1/1974 | Shellhause | 303/6 C X |
| 3,817,584 | 6/1974 | Huston et al. | 188/349 X |
| R28,253 | 11/1974 | Stelzer | 188/349 X |

*Primary Examiner*—George E. A. Halvosa
*Assistant Examiner*—Douglas C. Butler
*Attorney, Agent, or Firm*—Harness, Dickey & Pierce

[57] ABSTRACT

A dual hydraulic brake system incorporating a dual master cylinder for separately pressurizing the front and rear brakes of a vehicle. A pressure limiting device is positioned in the brake system for the front wheels which have disc-type brakes. The device prevents the front brakes from being energized until the rear drum-type brakes are functioning and then proportions the pressure applied to the front brakes. Also, an apparatus for providing an indication to the operator of failure of either the front or rear brakes, which apparatus will automatically reset itself upon correction of the failure, is positioned adjacent the pressure limiting device and is responsive to fluid pressure in both systems.

14 Claims, 4 Drawing Figures

METERING AND PROPORTIONING VALVE MECHANISM

SUMMARY - BACKGROUND OF THE INVENTION

The present invention relates to an apparatus which is incorporated in a dual hydraulic brake system for a vehicle.

In automotive and other vehicles having dual hydraulic brake systems and disc-type brakes on the front wheels and drumtype brakes on the rear wheels, it is necessary to have the braking forces and torques be applied approximately simultaneously to the front and rear wheels. This prevents a dangerous skidding condition. It is also desirable in such systems to provide an indication to the vehicle operator of the occurrence of a failure of either the front or rear brakes.

Also, where a line of vehicles is being assembled, and a standard chassis, brake system, disc brake calipers, and the like are being utilized for all of the vehicles in the product line, it is necessary to provide a braking system which will have application for all the vehicles, regardless of their weight or the use to which they will be put. This problem becomes critical where the vehicles comprise trucks and the difference in vehicle weight from the lightest and smallest end of the product line to the heaviest and largest end is substantial. In such cases, if large caliper disc-type brakes are utilized on the front wheels, then it is necessary to limit their functioning and balance the braking forces between front and rear wheels so that undesirable and potentially dangerous high braking torques will not be produced in the lightest trucks. The present invention provides an apparatus for solving this problem and at the same time for prohibiting the application of the disc brakes on the front wheels until the drum-type brakes on the rear wheels are functioning and for providing a brake system failure warning indication.

Limiting the pressure applied to the front wheels on trucks and other heavy road vehicles does not create any conflict with the weight transfer which occurs during braking applications. On the smaller, lighter truck models, the large heavy-duty disc brakes provide more than sufficient braking torque and force on the front wheels. On the larger, heavier truck models, the additional weight of the truck itself provides sufficient weight to prevent the rear wheels from skidding. Further, if the truck is loaded to any extent, that load is generally centered over the rear axle and provides additional downward force on the rear wheels.

Other objects, features and advantages of the present invention will become apparent from the subsequent description and claims taken in conjunction with the accompanying drawings.

BRIEF DESCRIPTION OF THE DRAWINGS

FIG. 3 is a graphical illustration of front wheel braking pressure plotted against master cylinder line pressure, and;

FIG. 4 is a longitudinal sectional view of a brake system apparatus illustrating another embodiment of the present invention.

DESCRIPTION OF THE PREFERRED EMBODIMENTS

Figure 1:
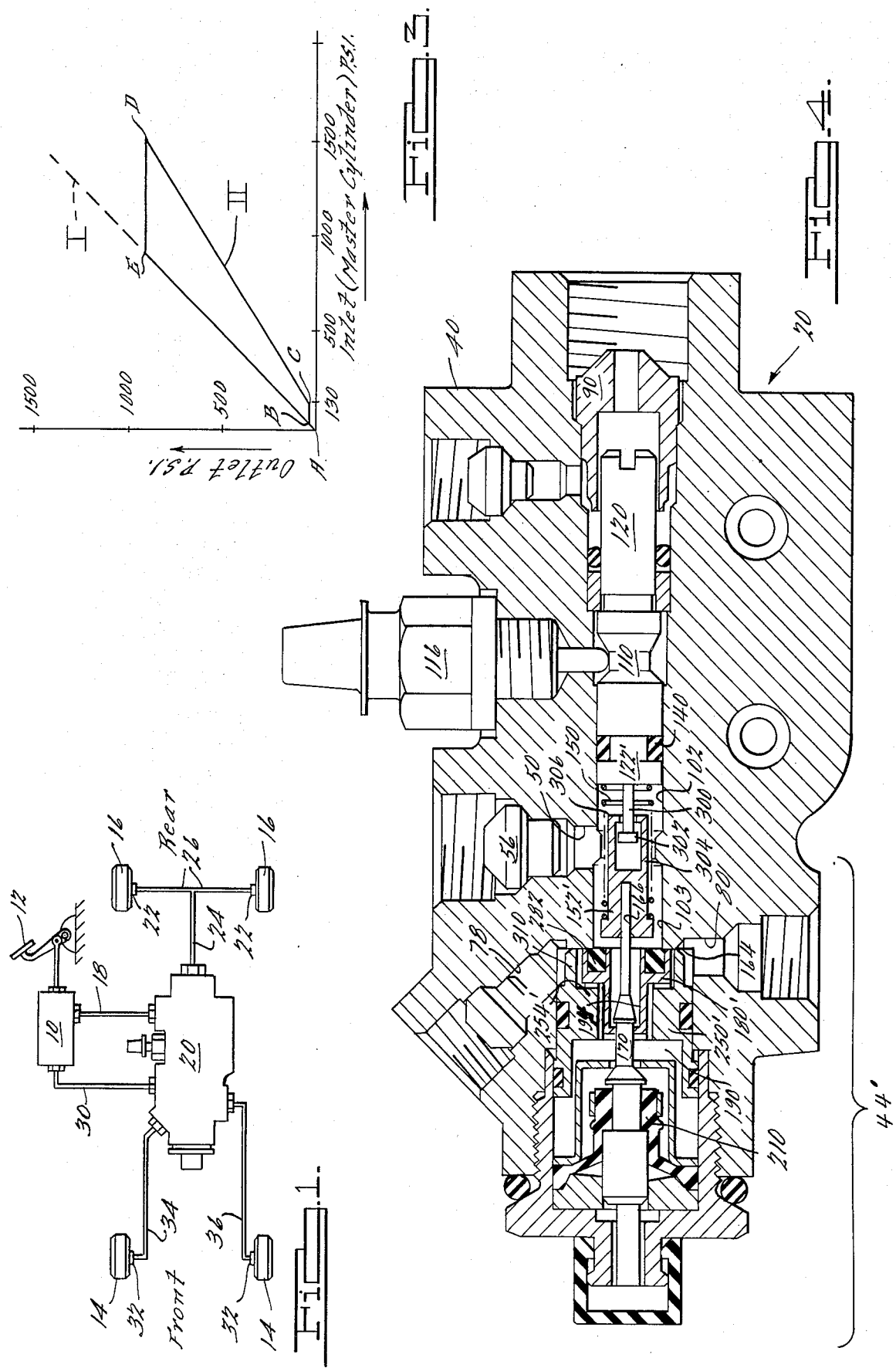
FIG. 1 is a generally schematic diagram depicting the brake system apparatus of the present invention in a hydraulic circuit for a vehicle.

The brake system apparatus 20 of the present invention is adapted for interposition in a standard vehicle braking system as diagrammatically illustrated in FIG. 1. The apparatus 20 is utilized with a braking system which includes a dual master cylinder 10 which is operated by a brake pedal 12 to deliver brake fluid under pressure to the brakes on the front wheels 14 and the rear wheels 16. As to the rear wheels 16, the pressurized fluid is delivered through conduit 18 to the apparatus 20 and then to a pair of rear brake cylinders 22 via conduits 24 and 26. Fluid under pressure from the master cylinder 10 is also transmitted through a conduit 30 to the apparatus 20 and then to a pair of front brake cylinders 32 via conduits 34 and 36.

Figure 2:
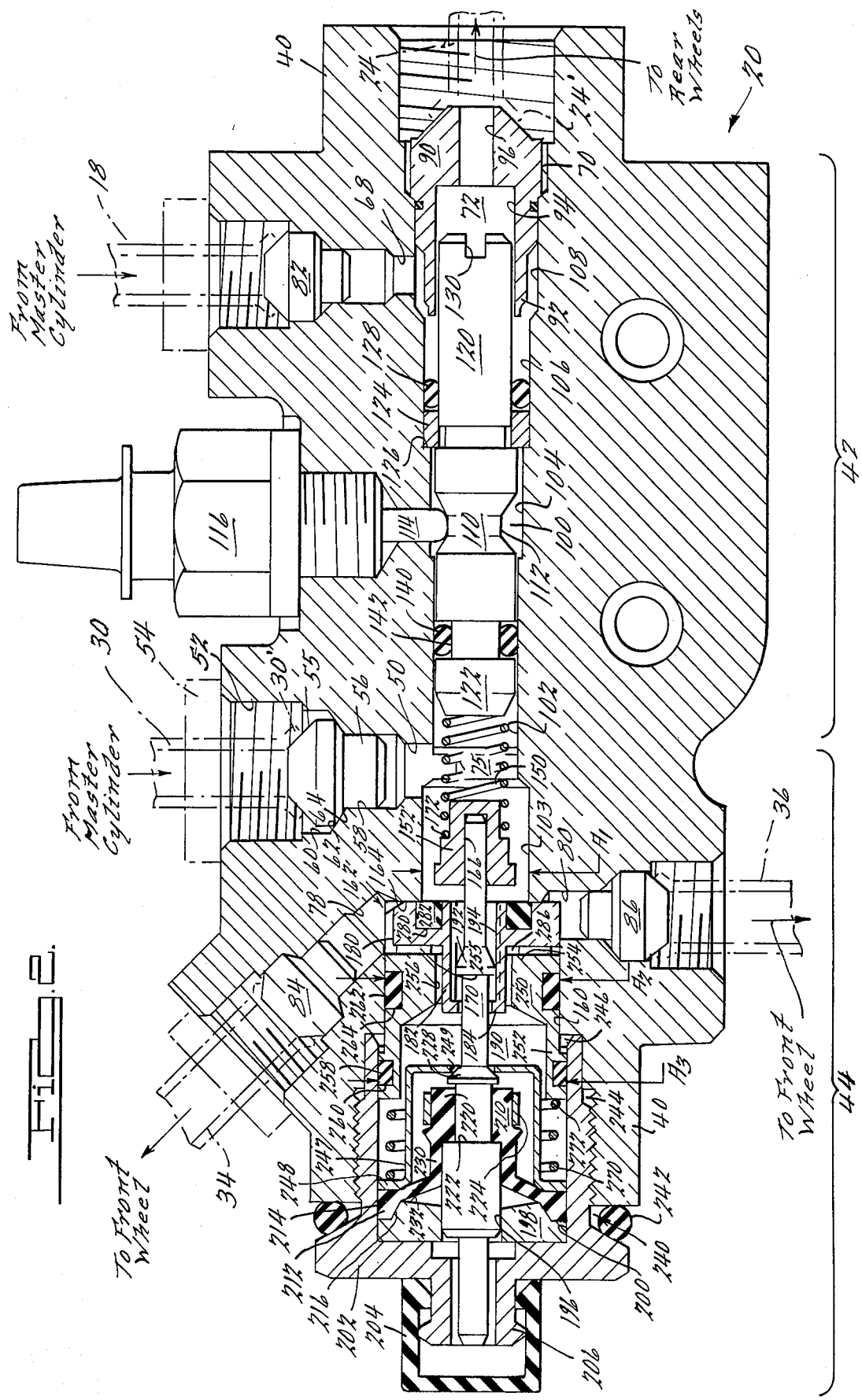
FIG. 2 is a longitudinal sectional view of a brake system apparatus illustrating one embodiment of the present invention.

As shown in FIG. 2, the apparatus or device 20 includes a housing 40 which comprises a failure indicator assembly 42 and a fluid pressure limiting valve assembly 44. Fluid pressure is transmitted from the master cylinder 10 through one side of the failure indicator assembly 42 in housing 40 to the rear brake cylinders 22. At the same time, fluid pressure from the master cylinder 10 is transmitted through the other side of the failure indicator assembly 42 and through the pressure limiting valve assembly 44 in the housing 40 to the front brake cylinders 32.

The housing 40 has an inlet opening 50 adapted to communicate with conduit 30 and thus supply pressurized fluid from the master cylinder 10 to the assemblies 42 and 44. The inlet opening 50 has an enlarged threaded outer end 52 adapted to receive a threaded nut 54 (shown in hidden lines) for securing the conduit 30 to the housing 40. The lower end 30' of the conduit 30 is flared outwardly in order to mate with the sloped upper surface 55 of tube seat 56 positioned in the inlet opening 50. The tube seat can be made of any metal which will not react adversely with the brake fluid, but preferably is made of brass.

The inlet opening 50 has enlarged diameter portions 58 and 60 for positioning of the tube seat 56. A sloped surface 62 is provided between portions 58 and 62 for mating with a corresponding sloped lower surface 64 on the tube seat 56.

The combination of the tube seat 56, the conduit 30 (including its flared lower end 30'), the nut 54 and the various sized and shaped portions of the inlet opening 50 provide a fluid tight seal for passage of the pressurized fluid from the master cylinder 10 into and through the housing 40. If desired, any other conventional type of sealing means, such as O-ring, can be utilized separately or in combination with a tube seat to seal the inlet opening 50 from possible leakage of brake fluid.

The housing 40 has a second inlet opening 68 adapted to communicate with conduit 18 and thus supply pressurized fluid from the master cylinder 10 to the assembly 42. The housing 40 also has several outlet openings. Outlet opening 70 is adapted to communicate the pressurized fluid in chamber 72 with conduit 24 and in turn with rear brake cylinders 22. Outlet openings 78 and 80 are adapted to communicate the pressurized fluid passing into and through the valve assembly 44 with conduits 34 and 36 and in turn with the front brake cylinders 32.

The inlet opening 68 and outlet openings 70, 78 and 80 are preferably sealed in the same manner described above with reference to inlet opening 50. For this purpose, tube seats 82, 84 and 86 are provided in openings 68, 78 and 80, respectively, and the conduits 18, 34 and 36 are provided with outwardly flared lower ends. In outlet opening 70, safety stop 90, which is described in more detail below, is provided. The outer end of the stop 90 is adapted to provide the same function as a tube seat and effectively seals opening 70. The flared end 24' of conduit 24 mates with the stop 90 and is held in place by means of a threaded nut (not shown).

In the event of failure in either the front or rear brake systems, it is desirable to provide a warning signal to the vehicle operator. This function is carried out by the brake failure indicating assembly 42. The warning valve assembly 42 is preferably of a type similar to that shown and described in U.S. Pat. No. 3,480,333, issued on Nov. 25, 1969 to William Stelzer, the disclosure thereof which is incorporated herein by reference.

The failure indicating device 42 provides a warning signal to the operator as soon as one of the brake systems fails and allows the operator to take precautionary measures prior to actual application of the brakes. The device 42 also automatically recenters or resets itself as soon as the pressure in both systems is returned to normal, thus eliminating the costly and time consuming manual resetting often encountered with other types of warning indicators.

The housing 40 has a generally central longitudinally extending bore 100 having various stepped diameters along its length. The bore 100 includes a small diameter portion 102 on one end of the failure indicator assembly 42. The bore 100 increases in diameter in stepped fashion toward the other end of the assembly 42 by means of bore portions 104, 106, 108 and 70.

Adjacent the bore portion 102 and extending into the valve assembly 44, is bore portion 103 which is slightly larger in diameter than portion 102. Bore portions 102 and 103 together form chamber 75 which communicates directly with inlet opening 50. The bore portions 102 and 103 function with the valve assembly 44 as will be described hereinafter. The bores 102 and 103 provide an indication of master cylinder input pressure to assembly 44 and to one end of assembly 42 (the left end in FIG. 2).

The bore portions 106 and 108 together form chamber 72 and communicate directly with inlet opening 68. Inlet opening 68 provides an indication of master cylinder pressure to one side of assembly 42 (the right side in FIG. 2).

A detent member 110 (sometimes called a movable shuttle piston) is slidably located in bore portions 102 and 104 and has an annular groove 112 adapted to receive a plunger 114 of an electrical switch 116. The electrical switch is adapted to be deactuated when the plunger 114 is fully extended, as shown in FIG. 2. In this position, the switch 116 does not provide any signal to the vehicle operator. Electrical switches which can be utilized as switch 116 are well known and it is not necessary herein to describe their internal structure and operation. Any such switch, however, preferably should have a spring or other resilient member therein adapted to normally retain the plunger 114 in the extended position shown in the drawings.

Upon movement of the shuttle member 110 either to the right or left, in response to failure of either the front or rear brake system, the plunger 114 will be moved upwardly out of the groove 112 and activate the switch 116. When the switch 116 is activated, an indication, such as a visual or audio signal, is provided to the vehicle operator.

The shuttle member 110 has a piston portion 120 on one end and a piston portion 122 on the opposite end. The diameter of the portion 120 is less than the diameter of the portion 122 in order to effectuate self-centering, as described below.

The piston portion 120 is slidably supported by an annular bushing 124 which in turn is slidably located in bore portion 106. The diameter of the bushing 124 is greater than the diameter of piston portion 122. The bushing 124 also extends radially inwardly to partially overlap bore portion 104 and is engageable with shuttle member 110 for a purpose to be described hereinafter.

The pressure in chamber 72 and hence in bore portion 106 normally maintains bushing 124 in engagement with a shoulder 126 defined by the juncture of bore portions 104 and 106. An O-ring 128 on piston portion 120 provides a seal between bore portions 104 and 106. Groove 130 in piston portion 120 merely provides for ease of assembly of several of the internal parts of the apparatus 20.

Safety stop 90 is situated in the right end of chamber 72. A cylindrical shell 92 surrounding a bore 94 is provided on the stop 90. The bore 94 is of such a diameter and depth so that the piston portion can easily slide within it when the portion 120 is displaced in the event of a failure in the rear brake system. The shell 92, which also can comprise a plurality of spaced fingers extending from the base of the stop 90, extends into the bore 108. The end of the shell (or fingers) 92 provides a "stop" for O-ring 128 in the event that the O-ring becomes displaced too far along the length of piston portion 120.

A central aperture 96 is provided in the base of the stop 90 so that brake fluid can easily pass from the chamber 72 into and through the conduit 24 to the rear wheels. Hence at all times, a free passageway is provided for pressurized brake fluid from the master cylinder 10 to the rear brake cylinders 22.

An O-ring 140 is provided in an annular groove 142 in piston portion 122. O-ring 140 provides a seal between bore portions 102 and 104. The combination of O-rings 128 and 140 provide a fluid-tight seal between the fluid for the front brake system (in bore 102) and the fluid for the rear brake system (in bores 106 and 108).

Spring 150 is positioned between piston portion 122 and valve cap member 152 which is part of the fluid pressure limiting valve assembly 44. The spring pressure from spring 150 is light and does not affect the operation of the shuttle member 110.

The pressures in chambers 75 and 72, and thus in bore portions 102 and 106, are normally substantially equal. Since piston portion 122 is larger in area than piston portion 120, a net force to the right in FIG. 2 is developed. This force is opposed by bushing 124 which by the pressure in chamber 72 is seated on shoulder 126 and against member 110. Hence shuttle member 110 is rigidly held in place and will not move. In the event of failure of the rear brake system (loss of pressure in conduits 18 and/or 24), the pressure in chamber 75 will exceed the pressure in chamber 72. As a result, piston portion 122 and hence shuttle member 110, as well as bushing 124 and piston portion 120, will be displaced to the right actuating the switch 116 and providing a failure indication to the vehicle operator.

In the event of failure of the front brake system (loss of pressure in conduits 30, 34 and/or 36), the pressure in chamber 72 will exceed the pressure in chamber 75. As a result, piston portion 120 and hence shuttle member 110 will be displaced to the left actuating the switch 116 and providing a failure indication to the vehicle operator.

As previously noted, the failure indicating apparatus will automatically reset upon correction of the failure condition (or termination of a transient causing unwanted actuation). In the event of failure of the rear brake system as the detent 110 is moved to the right it will move piston portion 120 and bushing 124 to the right. Upon correction of the failure condition and upon the next application of the brake pedal 12, the fluid pressures in bore portions 102 and 106 will again be substantially the same. The force via piston portion 122 urging the shuttle member 110 to the right will be determined solely by the effect of the area of piston portion 122. However, the force on shuttle member 110 urging it to the left will be determined not only by the effect of the area of piston portion 120, but also by the effect of the area of the bushing 124. The extra force via bushing 124 will cause the detent member 110 to be moved to the left until bushing 124 engages shoulder 126 and member 110 will be returned to its centering position. At this position, the switch 116 will be deactuated.

A similar operation occurs upon failure and repair of the front brake system. In the event of such a failure, the shuttle member 110, together with piston members 120 and 122, will move to the left causing the switch 116 to be activated. The bushing 124 remains in its position abutted against the shoulder 126. Upon correction of the failure condition (or false indication resulting from a transient) and upon the next application of the brake pedal 12, the fluid pressures in bore portions 102 and 106 and thus in chambers 72 and 75 again will be substantially the same. The force via piston portion 120 urging the member 110 to the left will be determined by the effect of the area of the portion 120; the force on the shuttle 110 urging it to the right will be determined by the effect of the area of the piston portion 122. Since portion 122 is larger in diameter than portion 120 and hence has a greater area exposed to the fluid, the member 110 will be moved to the right until it engages the bushing 124. At that point, the member 110 will have been returned to its central position deactuating the switch 116.

Although the failure indicator assembly 42 has been described with the shuttle member 110, the piston portion 120 and the piston portion 122 as being part of a one-piece integral unit, it is understood that these three members can be separate parts. The operation of the assembly 42 in the event of a brake system failure and repair would be exactly the same. Also, it is possible to provide the piston portions 120 and 122 of substantially the same diameters and provide an annular bushing in bore 102 adjacent the left end of member 110. Such an arrangement is described in U.S. Pat. No. 3,480,333. Again, the operation of the assembly 42 would be the same.

The fluid pressure limiting valve assembly 44 is used to retard and limit the delivery of fluid pressure to the front brake cylinders 32. In vehicles where the front brakes are disc brakes and the rear brakes are drum brakes, as is standard on many types of vehicles today, a straight metering valve assembly is usually provided. Such a metering valve is interposed between the master cylinder and the disc brake cylinders and retards the delivery of fluid pressure to the disc brake cylinders during pedal application until the master cylinder pressure reaches a predetermined level.

When disc brakes are applied, they produce a brake torque almost as soon as hydraulic pressure is developed in the system whereas drum brakes require a substantial hydraulic pressure in the system before they produce a brake torque. Drum brakes utilize relatively heavy return springs, the force of which must be overcome before the shoes contact the drum while disc brakes use either no return springs or very light return springs. In either case, the disc brakes require only a relatively small pressure at their brake cylinders to cause actuation thereof.

If a vehicle is provided with drum brakes on its rear wheels and disc brakes on its front wheels and no metering valve for the disc brakes is employed, the disc brakes will develop high braking torque during a light brake application. As a result the linings of the disc brake shoes will tend to wear out prematurely.

Preferably, the level at which the metering valve permits delivery of fluid to the disc brakes is equal to or greater than the pressure at which the force of the drum brake return springs will be overcome. Hence, the disc brakes will produce a braking torque at the same time or after the drum brakes and inadvertent application of the disc brakes will be prevented. A metering valve assembly is shown and described, for example, in U.S. Pat. Re. No. 28,253 to William Stelzer.

In the production of trucks and other large road and off-road vehicles, it is sometimes preferably, for production of other purposes, to use a single size and type of disc brakes on the front wheels for all models in a certain line. Due to the substantial range of sizes and weights of models in a line of trucks, it is thus necessary to use a large size and type of disc brakes so that adequate braking forces will be present on the largest and heaviest models. Such large disc brakes, however, create problems on the smaller and lighter models in the product line. On such models, the brakes will produce a substantial amount of torque, often too much torque for safe control of the vehicles. As a result, the front brakes will have a tendency to lock up possibly causing dangerous skidding conditions.

In such vehicles, it is necessary to balance the torque and braking forces to the front and rear wheels. The fluid pressure limiting valve assembly 44 described herein accomplishes that result.

As described above, fluid pressure from the master cylinder 10 is delivered through the conduit 30 and inlet opening 50 into chamber 75. The valve assembly 44 is adapted to both meter and proportion the delivery of fluid pressure to the outlet openings 78 and 80 and thus to the front disc brake cylinders 32. It should be noted that it is also possible to provide only a single outlet and thus only a single conduit from such outlet exiting from the assembly 44 to the front brake cylinders.

The inlet opening 50 is in communication with the outlet openings 78 and 80 via generally cylindrical bores 103 and 106. A pressure responsive valve assembly, indicated generally by number 162, and arranged adjacent the shoulder 164 formed between the bores 103 and 106, is adapted to control communication between the inlet 50 and the outlets 78 and 80.

Valve cap member 152 forming a part of assembly 162 is movably disposed in bore 103. Cap members 152 is generally centrally located in bore 103 and is of such a size to allow sufficient clearance for passage of hydraulic fluid in bore 103. The cap member 152 is generally cylindrical and is provided with a central bore 166 so that it can be positioned on the end of push rod 170. As described above, spring member 150 is positioned between the cap member 152 and piston portion 122. The spring 150 abuts on shoulder 172 on member 152 and provides a light spring pressure maintaining member 152 on the push rod 170.

The push rod 170 is of sufficient length so that the cap member 152 is not normally engageable with the valve plate 180. The cap member does not become engageable with the valve plate 180 until the brake pedal 12 is actuated, and only then under certain pressure conditions (as described below).

The valve plate 180 is generally "hat-shaped" with a cylindrical projection or shell 182 extending downwardly along the length of the push rod 170 away from the cap member 152. The projection 182 has a plurality of grooves or slots therein to facilitate passage of fluid from chamber 75 into chamber 190 and into outlet openings 78 and 80. In this regard, it is also possible to provide the valve plate 180 with a plurality of fingers or projections in place of the slotted shell 182. An annular projection or other protrusion 192 is provided on the push rod 170 to hold the valve plate 180 and push rod 170 together during assembly. One or more inwardly extending catches or locking members 184 are provided on the end of the shell (or fingers) 182 for the same purpose.

The push rod 170 is slidably received in a central opening 194 in the valve plate 180, as well as in the interior of the shell 182. Sufficient clearance is maintained between push rod 170 and walls of opening or passageway 194 so that fluid can be freely passed through the passageway. The push rod 170 is also slidably positioned in central opening 196 formed in a washer or diaphragm back-up plate 198. The washer 198 is positioned in bore 200 which is formed in the interior of cap or plug 202. The plug 202 is threadedly fastened in the end of housing 40 and holds the washer 198 in place. A flexible dust cap or boot 204 surrounds a reduced end 206 of the plug 202 and the outer end of the push rod 170. The boot 204 keeps dirt, grease and other foreign matter from gaining access to the opening 196.

A diaphragm 210 is positioned in bore 200. The diaphragm 210 has an outer flanged end 212, an inner flanged end 220, an axial section 230, and a radial section 232. The outer flanged end 212 is firmly positioned in an annular groove 214 formed between the wall of the bore 200 and a reduced inner end portion 216 of the back-up plate 198. The flanged end 212 forms a seal preventing the flow of fluid past the outer periphery of the washer 198 and also positions the diaphragm 210 within the bore 200. The inner flanged end 220 is radially inwardly extending and is positioned to snugly fit over and grip the push rod 170. The flange 220 is held in place on the push rod 170 adjacent a radial shoulder 222 by a split clamp 224. An annular projection or protrusion 228 is provided on the push rod 170 to hold parts of the valve assembly 44 in place during assembly. The projection 228 also helps hold the flange 220 in place on the push rod 170.

The intervening axial and radial sections 230 and 232, respectively, are somewhat thinner and more flexible than the flanges 212 and 220. The diaphragm 210 is formed of molded flexible rubber or other suitable material and is molded or otherwise suitably formed to the configuration illustrated in FIG. 2. The diaphragm 210 normally holds the push rod 170 in the position illustrated in FIG. 2 so that the valve cap member 152 is maintained in clearance relationship with valve plate 180. In this manner, central passageway 194 is kept open. However, when a fluid force within the bore 200 acts against the diaphragm 210, the radial section 232 moves against the washer 198 and the push rod 170 moves within the bore 200 whereupon the cap member 152 moves toward (and engages under certain conditions) the valve plate 180 by action of the spring 150. When the external force is removed, the resilient diaphragm 210 returns to its natural configuration and the parts resume the positions shown in FIG. 2.

An atmosphere vent 240 is provided between the plug 202 and the end of the housing 40. The vent 240 is sealed by O-ring 242 or other suitable means to prevent dust, grease or other foreign materials or fluids from entering the joint formed by the plug 202 and the housing 40. Due to the presence of vent 240, generally annular shaped chambers 244 and 246 are retained at atmospheric pressure.

A metal retainer 247 is positioned in the bore 200 adjacent the diaphragm 210 and is provided to hold several parts (such as the spring 270 and the spool 250) of the valve assembly 44 in place during assembly. A radially extending flange 248 is contained on one end of the retainer 247 and is positioned adjacent the flange 212 of the diaphragm 210. The retainer 247 has a central opening 249 through which the push rod 170 is slidably positioned. The opening 249 is of sufficient size to allow hydraulic fluid to freely pass through it and act on the diaphragm 210. A number of other holes, slots, or the like (not shown) also can be provided on the body of the retainer 247 to insure that pressurized fluid will freely act on the diaphragm 210.

Slidable member or spool 250 is slidably positioned in bores 160 and 200 between the diaphragm 210 and the valve plate 180. The spool 250 is generally cup-shaped with an axial extending flange 252 at one end and a somewhat larger and thicker radial extending flange 254 at the other end. A plurality of flutes or projections 225 extend from the flange 254 and, as explained below, allow the spool 250 to contact the valve plate 180 and at the same time allow hydraulic fluid to pass from the chamber 190 through passageway 286 to outlets 78 and 80. An opening or passageway 256 is provided in the center of the spool 250. The passageway 256 is of sufficient diameter to allow the shell 182 of the valve plate 180 to be positioned freely within it and allow passage of fluid through it. An O-ring 258 or other suitable sealing means is provided in groove 260 in flange 252. The O-ring 258 bears against the bore 200 of plug 202 and hence seals the chamber 190 and hydraulic fluid therein from the chambers 244 and 246 and the atmosphere. An O-ring 262 or other suitable sealing means is provided in groove 264 in flange 252. The O-ring 262 bears against the bore 160 and has essentially the same purpose as O-ring 258.

A compression spring 270 is positioned between the flange 248 of the retainer 247 and the end 272 of the flange 252 of the spool 250. The spring 270 pushes against the retainer 247 and holds it firmly in place.

This in turn firmly holds the diaphragm in place. The force of the spring 270 also pushes the spool 250 toward the valve plate 180 so that the flutes 255 contact the valve plate and hold it firmly against the shoulder (or valve seat) 164.

The valve plate 180 has a recess or groove 280 formed in its upper or inner end. An annular seal 282 is positioned in the groove 280. With the parts in the positions illustrated in FIG. 2, the seal 282 engages the shoulder 164 and prevents the flow of fluid therepast.

Before actuation of the brake pedal 12, the parts of the valve assembly 44 are in the positions shown in FIG. 2. The diaphragm 210 holds the push rod 170 against the valve cap 152 so that passageway 194 is open. Hence fluid entering inlet 50 from master cylinder 10 flows freely through chamber 75, around valve cap 152, through passageway 194, through chamber 190 or the slots in shell 182, through or into opening 256, through passageway 286 formed between spool 250 and valve plate 180, and into outlets 78 and 80 where it acts on the front brake cylinders.

When the brake pedal 12 is initially actuated, fluid is delivered from the master cylinder 10 through the conduit 30 to the inlet opening 50. From there, fluid flows through the passageway 194 into chamber 190 where it acts on the diaphragm 210 biasing the flange 220 downwardly and the radial section 232 against the back-up plate 198. This moves the push rod 170 at a certain master cylinder pressure level away from the valve cap 152 whereupon the force of the spring 150 moves the cap 152 against the seal 282. This first level of master cylinder pressure is insufficient to actuate the brake cylinders 32. With the parts in this position, the valve 162 is closed and further fluid communication between the inlet 50 and the outlets 78 and 80 and thus between the master cylinder 10 and the front brake cylinders 32 is blocked.

As master cylinder pressure increases with further pedal pressure, it acts against the valve cap 152 and the valve plate 180, tending to move them. This force is opposed by the spring 270 and by the force exerted on the plate 180 by the small amount of fluid trapped within the chamber 190 (bores 160 and 200) when the valve cap 152 is seated against the seal 282. The force imposed by the fluid trapped in the chamber 190 at this point is comparatively small when compared with the force of the spring 270 and may be neglected here. Since the force of the spring 270 is substantially a constant, it is necessary for the master cylinder pressure to reach a second predetermined level before the plate 180 is moved away from the shoulder 164 thereby opening the valve 162. When the valve 162 is opened, pressurized fluid is allowed to pass directly from the inlet 50, through bore 103 and into the outlets 78 and 80. Fluid then flows into conduits 34 and 36 and pressurizes the front wheel brake cylinders 32. This is the point of initial actuation of the front wheel brake cylinders and is determined by the master cylinder pressure at the inlet 50 required to overcome the force of the spring 270. This second master cylinder pressure level (sometimes called "cut-in" pressure) is at least equal to or greater than that required to overcome the force of the heavy return springs utilized in the rear wheel drum brakes. Thus, premature energization of the front disc brakes is prevented and a braking torque is not developed at the disc brakes until at least a breaking torque is developed at the rear drum brakes.

When the valve 162 opens as described, the master cylinder pressure or pressure at the inlet 50 develops a force on the valve cap 152 and valve plate 180 just sufficient to overcome the force of the spring 270. When the valve 162 opens, fluid enters the chamber 190 from the master cylinder 10 and increases the pressure therein. This pressure acts on the valve plate 180 in a direction assisting the spring 270 and tends to move the valve plate back toward the shoulder 164 seating the seal 282 and closing the valve 162.

The spool 250 also provides a force assisting the spring 270 and closing the valve 162. As shown in FIG. 2, the bore 200 is larger in diameter than bore 160. Thus, the left side area on spool 250 exposed to the pressurized fluid in chamber 190 ($A_3$) is greater than the right side area on spool 250 exposed to fluid pressure ($A_2$) and a force is created which acts to seat valve plate 180. After the valve 162 is closed and the fluid pressure in chamber 75 is increased again by the master cylinder 10, the increased level of fluid pressure will act against the valve plate 180 over an effective circular area having a diameter equal to the mean sealing diameter of the seal 282; this is essentially the diameter of the bore 103 and is indicated in FIG. 2 as $A_1$. This produces a force on the valve plate 180 tending to reopen the valve 162 to deliver at least a portion of this increased fluid pressure to the outlets 78 and 80. Any of this increased fluid pressure delivered to the outlets 78 and 80 creates an opposing force on the opposite side of valve plate 180 and on spool 250. This, of course, tends to reclose the valve 162. The net closing force is determined by the area $A_3 - (A_2 - A_1)$. The opposing forces on the valve plate 180 tend to keep it closely adjacent the valve seat 164 for the restricted flow of fluid from the inlet opening 50 to the outlet openings 78 and 80. The valve 162 will alternately open and close (modulate) in a similar manner with increasing master cylinder pressure throughout the remainder of the application of the brakes. As a result, the pressure allowed to pass through valve 162 and energize the front wheel disc brake cylinders will increase at a lower rate than the pressure introduced into inlet 50 from the master cylinder.

The ratio of the inlet to outlet pressures of assembly 44 is determined by the relationship of the effective areas of such assembly. In this regard, the following equation determines the outlet pressure $P_O$ existing in outlet openings 78 and 80:

$$P_O = \left[\frac{F_S}{A_1} + \frac{A_5 P_H}{A_1}\right] + P_R\left[P_I - \left(\frac{F_S}{A_1} + \frac{A_5 P_H}{A_1}\right)\right]$$

In this equation, $F_S$ is the force of spring 270; $A_1$ is the mean sealing diameter of seal 282 (essentially the area of bore 103); $P_H$ is the hold-off pressure (the pressure at which valve cap 152 seats against seal 282); $P_I$ is the inlet pressure (master cylinder pressure existing at inlet 50); $A_5$ equals $A_3 - A_2$ where $A_3$ is the larger area of spool 250 (in bore 200) and $A_2$ is the smaller area of spool 250 (in bore 160); and $P_R$ is the proportioning ratio and equals $$\frac{A_1}{A_3 - A_4}$$

where $A_4$ equals $A_2 - A_1$. (The areas corresponding to $A_1$, $A_2$ and $A_3$ are indicated in FIG. 2.) Thus, for a given increase in inlet or master cylinder pressure $P_I$, there is a smaller increase in outlet pressure $P_O$ so that fluid pressure delivered to the disc brakes above the cut-in pressure level increases at a lower rate than master cylinder pressure.

When the brake pedal 12 is released, master cylinder or inlet pressure $P_I$ drops. Since the inlet pressure in chamber 75 is greater than the outlet pressure in chamber 190, the valve 162 remains closed until the inlet pressure decreases to a point where it is equal to the outlet pressure. Thereafter, the forces on the valve plate 180 cause valve 162 to remain closed, but at the same time the forces cause valve cap 152 to unseat itself from the valve plate 180 opening an unrestricted passageway from the outlets 78 and 80 to the inlet 50. The light spring force caused by spring 150 is easily overcome by the pressure of the fluid in chamber 190. Even though the push rod 170 remains in a downward position when the brake pedal 12 is released as a result of the fluid pressure in the chamber 190 which acts on the diaphragm and holds the diaphragm flange 232 against the washer 198, the valve cap 152 can slide easily to the right (in FIG. 2) along the push rod 170. Fluid pressure is relieved from the outlet openings 78 and 80, through the passageway 286, into chamber 190 or through the slots in shell 182, through the passageway 194, into bore 103, around valve cap 152, and into chamber 75 and inlet 50.

FIG. 3 is a graphical representation of the braking pressure at the front wheel cylinders 32 in one typical brake system embodying the present invention. The line I represents master cylinder pressure which is also the pressure at inlet opening 50 as well as the pressure delivered (via assembly 42) to the rear wheel brake cylinders 22. The line II represents the pressure delivered to the front wheel brake cylinders 32 via the assembly 44.

Prior to actuation of the brake pedal 12, the pressure in the two brake systems is negligible. This is point A in FIG. 3. When the brake pedal 12 is depressed, the valve cap 152 seats against the seal 282 at a relatively low master cylinder pressure, as discussed above. This pressure is typically on the order of 10 – 15 p.s.i. and is represented on the graph at point B. It is necessary to allow this slight pressure to be applied to the front wheel brake system; it provides for system communication and relieves any thermal or other undesirable forces which might have been built up in the system. The initial closing of the passageway 194 occurs, as described above, when a master cylinder pressure is developed sufficient to flex the diaphragm and move it back against the back-up plate 198. Since this occurs regardless of the rate of pedal application, the system cannot be "beat" by slow or light brake pedal application (such as when the operator keeps one foot on the brake pedal and thus "rides" the brakes). Hence, the front wheel disc brakes cannot be prematurely applied.

Thereafter, as pressure is being applied to the rear brake cylinders, the valve 162 remains closed and no additional pressure is applied to the front disc brakes. This stage is indicated on the graph as B - C. When the pressure in the master cylinder 10 reaches the pressure needed to overcome the force of the drum brake return springs, which typically is on the order of 130 – 300 p.s.i., the force of spring 270 is overcome and the valve 162 opens. This is point C on the graph (called the "cut-in" pressure). The exact location of point C will depend, of course, on the size of springs in the rear drum brakes and in turn on the size of the spring 270 used in assembly 44. At this pressure, the valve 162 opens and some fluid is delivered to the front disc brake cylinders 32 and pressurizes the disc brakes. Thereafter the valve 162 alternately opens and closes, as described above, and the pressure within the outlets 78 and 80 and thus to the front disc brakes, increases at a rate less than the rate of increase of master cylinder or inlet pressure. This stage is depicted by line C - D in FIG. 3. The proportioned rate of increase of pressure to the front brakes continues until the brakes are released (point D).

When the brakes are released, the outlet pressure remains constant for a short period of time while the inlet pressure drops substantially (line D - E in FIG. 5). Thereafter the valve 162 is closed, but the valve cap 152 is unseated and the pressures in the two brake systems are released substantially equally (line E - A in FIG. 3). When all of the pressure is relieved, the diaphragm 210 resumes its normal molded shape and the push rod 170 moves upwardly to hold the valve cap 152 in an open position.

Another embodiment of the present invention is shown in FIG. 4. In this embodiment, all of the parts shown are the same as those shown and described with respect to FIG. 2, except for the valve cap 152' and shuttle piston portion 122' located in chamber 75, and the valve plate 180' and the spool member 250' located in chamber 190.

As shown in FIG. 4, the piston portion 122' of shuttle piston 110 has a rod 300 thereon which projects into bore 102. The rod 300 has a head or knob 302 on its outer end for mating with the valve cap 152'. The valve cap 152' is slidably mounted via bore 166 on push rod 170 in the same manner as described above with reference to FIG. 2, but also has a shell or a plurality of fingers 304 projecting from the end opposite the bore 166. The shell 304 has one or more locking members 306 at its end for mating with the rod 300. When the apparatus 20 is assembled, the head 302 of rod 300 is pushed into the interior of the shell 304. In this manner, when the shuttle piston 110 is displaced to the right, the valve cap 152' will also be displaced to the right by the rod 300 and head 302, or at least the valve cap 152' will be prevented from moving to the left and seating on the valve plate 180'. Thus, in the event of a failure in the rear brake system, the combined piston portion 122' and valve cap 152' act as a safety valve and bypass device allowing passageway 194 to remain open. Pressurized fluid is applied directly to the front brakes without being limited or proportioned by assembly 44'.

The valve plate 180' and spool member 250' are merely different structural embodiments of the corresponding parts described above with reference to FIG. 2. The valve plate 180' is smaller in diameter than valve plate 180, although sealing member 282 is the same and acts in the same manner. The spool 250' has an annular shell or a plurality of fingers 310 projecting from the front edge of flange 254'. The shell 310 is adapted to meet and rest against the shoulder 164. The operation of the assembly 44' including valve plate 180' and spool 250' is essentially the same as assembly 44 described earlier.

While it will be apparent that the preferred embodiments of the invention disclosed above are well calculated to fulfill the objects above stated, it will be appreciated that the invention is susceptible to modification, variation and change without departing from the proper scope or fair meaning of the invention.

I claim:

1. A pressure limiting apparatus for a vehicle hydraulic brake system having a front brake system with disc brakes operable at a first preselected hydraulic pressure and a rear brake system with drum brakes operable at a second preselected hydraulic pressure in excess of said first preselected pressure, said apparatus comprising a body having an inlet connected to a hydraulic pressure source and outlet means connected to said front brake system, valve means in said body operable to block communication between said inlet and outlet means at pressures between said first and second preselected pressures and operable to restrict communication between said inlet and outlet means at pressures above said second preselected pressure, differential pressure responsive means normally operable to hold said valve means open, said differential pressure responsive means being movable to effectuate closing of said valve means at a first level of pressure from said pressure source, said first level of pressure being less than said first preselected pressure, said valve means being responsive to a second level of pressure from said pressure source approximately equal to said second preselected pressure to open said valve means, pressure responsive spool means in said body normally in contact with said valve means and having a net effective area exposed to hydraulic pressure acting to close said valve means, biasing means biasing said pressure responsive spool means in a direction to contact and close said valve means, whereby, upon a further increase in pressure above said second preselected pressure, such pressure acting against said net effective area of said pressure responsive spool means will move said pressure responsive spool means against said valve means thereby restricting the flow of hydraulic pressure to said outlet means and increasing pressure to said front disc brakes at a rate lower than pressure to said rear drum brakes.

2. The apparatus as defined in claim 1 further comprising failure indicating means in said body for providing a signal in response to failure of either the front or rear brake systems.

3. The apparatus as defined in claim 2 wherein the failure indicating means comprises a shuttle piston means responsive to hydraulic pressure in both the front and rear brake systems and normally being in a first condition in response to the pressures in both systems being approximately the same and being actuable to a second condition in response to the pressure in either system being significantly greater than the pressure in the other system and remaining in said second condition even after deactuation of the vehicle brake system, signal means for providing said signal in response to said shuttle piston means being actuated to said second condition, and reset means for automatically resetting said shuttle piston means from said second condition to said first condition in response to actuation of the vehicle hydraulic brake system and the pressure in both systems returning to normal.

4. The apparatus as defined in claim 3 wherein said reset means comprises at least one annular piston means operatively connected to said shuttle piston means and not effectively actuable on said shuttle piston means under pressures not normal in either system and responsive to a return to normal pressures in both systems to exert an unbalancing force on said shuttle piston means to return it to said deactivated position.

5. The apparatus as defined in claim 2 further comprising disabling means connected to said failure indicating means and actuable for preventing said valve means from blocking and limiting communicating between said inlet and outlet means.

6. The apparatus as defined in claim 5 wherein said disabling means is actuable only in the event of failure of said rear brake system.

7. The apparatus as defined in claim 1 wherein said valve means comprises a cap member and a valve plate, said differential pressure responsive means comprises a diaphragm, said pressure responsive spool means comprises a piston, and said biasing means comprises a spring.

8. The apparatus as defined in claim 7 wherein said spring is positioned between said diaphragm and said piston, and said spring forces said piston in contact with said valve plate.

9. The apparatus as defined in claim 7 wherein said valve plate has a passageway therein for flow of hydraulic pressure and said cap member is positioned adjacent said valve plate such that movement of said diaphragm at said first level of pressure seats said cap member on said valve plate and blocks said passageway.

10. The apparatus as defined in claim 9 wherein a push rod means operably connected to said diaphragm is positioned in said passageway in said valve plate and prevents said cap member from seating on said valve plate until said first level of pressure is attained.

11. The apparatus as defined in claim 10 wherein said cap member is biased in the direction of seating on said valve plate.

12. In a brake system for a vehicle having front brakes and rear brakes and having a front brake system separate from a rear brake system, the front brakes operable at a first preselected hydraulic pressure and the rear brakes operable at a second preselected hydraulic pressure in excess of said first preselected pressure, the improvement comprising a metering valve means and a proportioning valve means both connected in series circuit with said front brake system, said metering valve means including a differential pressure responsive means and operable to block communication of hydraulic pressure to said front brakes prior to reaching said first preselected hydraulic pressure until said second preselected pressure is attained, said proportioning valve means including a pressure responsive spool member and operable to restrict the pressure applied to the front brakes relative to said rear brakes at pressures above said second preselected pressure, said metering valve means and said proportioning valve means sharing a common valve mechanism which acts to limit the application of hydraulic fluid to said front brakes.

13. The apparatus of claim 12 wherein said proportioning valve means includes a pressure responsive member which has a net effective area acting to close said valve mechanism.

14. The apparatus of claim 13 wherein said metering valve means and said proportioning valve means share a common biasing means which biases said valve mechanism toward a closed position.

* * * * *